June 12, 1956

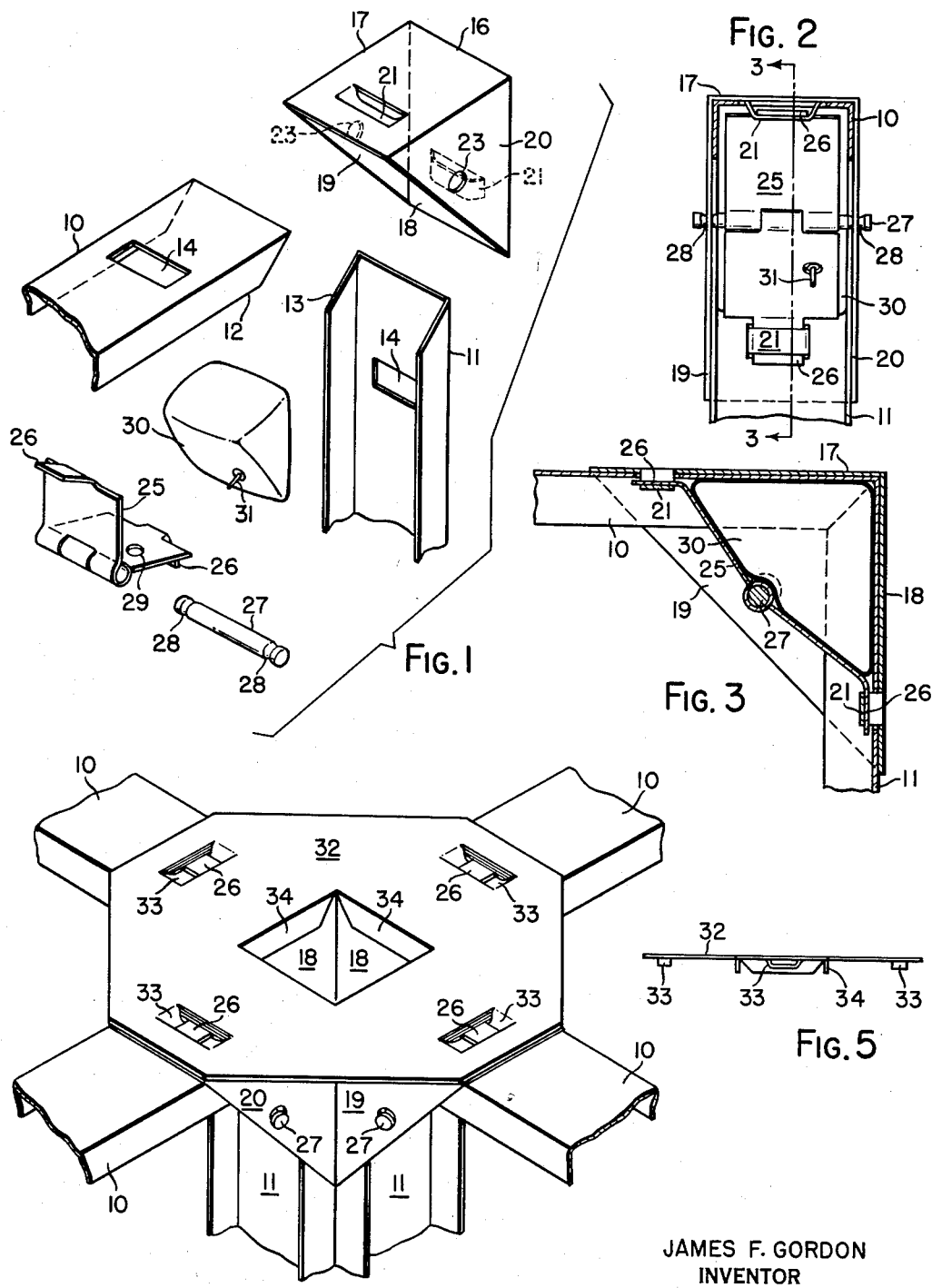

J. F. GORDON 2,750,014

PNEUMATIC JOINT

Filed Jan. 17, 1951

JAMES F. GORDON
INVENTOR

BY Paul E. Kerst

ATTORNEY

United States Patent Office 2,750,014
Patented June 12, 1956

2,750,014

PNEUMATIC JOINT

James F. Gordon, Towson, Md.

Application January 17, 1951, Serial No. 206,483

7 Claims. (Cl. 189—36)

This invention relates to construction joints and particularly to joints adapted for the rapid assembly and disassembly of buildings and structures of many types.

In many undertakings it is desirable to have available structures of an easily transportable, knockdown type, which may be easily and rapidly assembled in the field into strong, rigid units without the use of tools and may be as readily disassembled. The present invention fulfills the requirements for a joining means for such structures.

It is an object of this invention to provide a joint by means of which structural members may be quickly and easily joined without the use of tools.

It is another object of the invention to provide such a means which will strongly and rigidly unite structural members and hold them firmly against relative movement while so joined.

It is a further object of the invention to provide a joint which may be readily disassembled without tools and may be reused as often as needed.

It is still another object of the invention to provide a joint which is simple of construction and lends itself to use with structural members of standard shapes without excessive modification thereof.

The above and other objects and advantages of the invention are secured by a construction in which the ends of structural members to be joined are provided with slots. A cap member provided with punched out elements which match the slots is placed over and confines the ends of the members. A hinge is provided with end tabs which fit behind the punched out elements and a hinge pin which extends through the sides of the cap member. An inflatable bladder is contained between the hinge and the confined ends of the structural members and, when inflated, locks the whole assembly together.

Reference is now made to the drawing in which:

Fig. 1 is an exploded view, in perspective, of a joint embodying the invention, showing the various elements of which it is composed;

Fig. 2 is an elevational view of the assembled joint of Fig. 1 looking along one of the structural members which is joined;

Fig. 3 is a side elevational view, in cross-section, of the joint of Fig. 2 taken along the line 3—3 of Fig. 2;

Fig. 4 is a view, in perspective, of a joint joining more than two structural members, the joint being made up of a plurality of joints of the type shown in the preceding figures, all locked into a unitary structure;

Fig. 5 is an end elevational view of the locking plate of Fig. 4;

Figure 6:
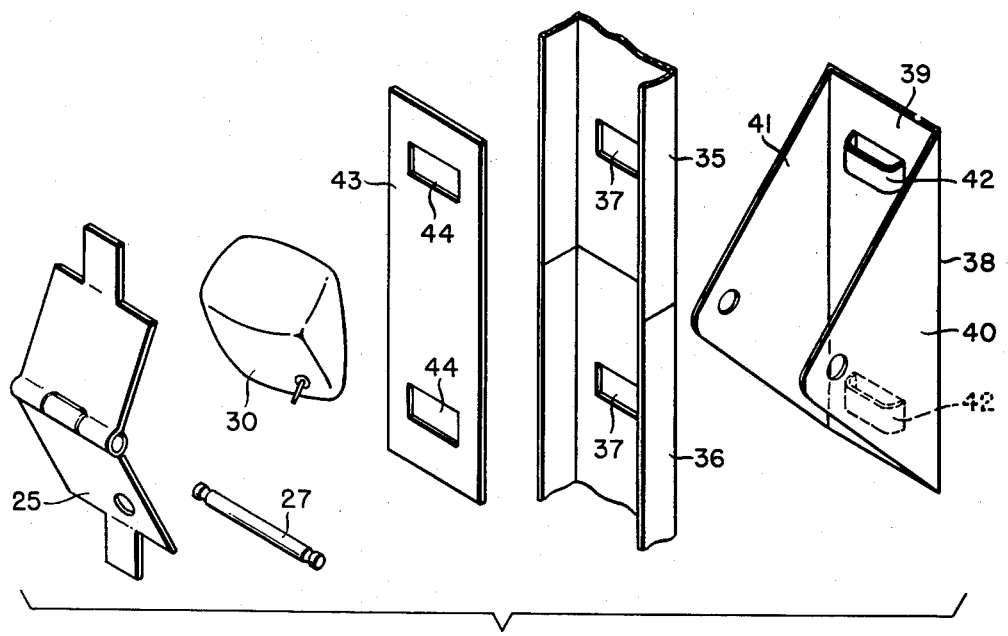
Fig. 6 is an exploded view, in perspective, of a joint for joining two endwise abutting structural members which extend in a straight line; and, Fig. 7 is an exploded view in perspective, of a joint similar to that of Figs. 1 and 2 but with the member 16 positioned between the ends of the joined structural members.

Referring now more particularly to the drawing, the joint is illustrated in Figs. 1, 2 and 3 as joining the ends of two structural members 10 and 11 which are of conventional channel shape. These members are to be joined at right angles and for this purpose the ends are bevelled at 12 and 13. Slots 14, which may be of identical shape and location, are formed near the ends of members 10 and 11.

A housing member 16 has two sides 17 and 18 which extend at right angles to each other and, when the joint is assembled, lie in facing contact with the ends of members 10 and 11, confining them snugly, as shown in Fig. 3. They are joined by the parallel sides 19 and 20. Each of the sides 17 and 18 is provided with inwardly extending struck out portions or loops 21. These portions are so located as to extend through the slots 14 in members 10 and 11 when the joint is assembled. The side pieces 19 and 20 have oppositely located holes 23 formed therein.

A hinge 25 has a tab 26 formed on each of its extremities, each tab being bent to extend at an angle with respect to the leaf of the hinge to which it is attached. A hinge pin 27 joins the two leaves of the hinge and protrudes beyond them at each end. The hinge pin has an annular groove 28 formed in each of its protruding portions. A hole 29 is formed in one of the leaves of the hinge.

The joint assembly is completed by a bladder 30 made preferably of resilient material. A valve stem 31 is adapted to protrude through the hole 29 when the joint is assembled.

The joint is shown completely assembled in Figs. 2 and 3. The two members 10 and 11 are placed with their bevelled ends in abutting relation and the housing 16 is fitted over them with the struck out portions 21 protruding through the holes 14. The hinge 25 is assembled with the tabs 26 passed through the struck out portions 21 and the hinge pin 27 joining the leaves of the hinge. The hinge pin is arranged with its ends extending through the holes 23 and the annular grooves 28 engaging the edges of the holes. The bladder 30 is placed between the hinge and the ends of the members 10 and 11. The valve 31 extends through the hole 29 in the hinge.

It can be seen that when the bladder is inflated it will lock all the elements of the joint together into a rigid assembly. The hinge will be forced outwardly from the joined ends of the members 10 and 11 forcing the tabs 26 to their full depth in the struck out portions 21 and forcing the pin 27 against the outside edges of the holes 23, the edges being engaged by the grooves 28, thus holding the pin against endwise movement. The pressure of the tabs against the struck out portions 21 draws the housing tightly in against the members 10 and 11 while the bladder presses the members 10 and 11 out against the housing. The dimensions of all the interlocking portions may be such that they may be fitted together easily by hand so that assembly of the joint requires no tools. Disassembly is likewise easy when the bladder is deflated.

Fig. 4 illustrates the utilization of the joint of Figs. 1 to 3 in the fabrication of a multiple joint. In this figure four pairs of members 10, 11, each pair joined as in the previous figures, are formed into a unitary assembly by means of a flat plate 32. This plate is provided with struck out portions 33 which fit down on top of the struck out portions 21 of the underlying joints. The tabs 26 of these joints fit in above the portions 33 locking the plate 32 to the four joints. The central portion of the plate may be open as shown, with flanges 34 bent down against the sides 18 of the housings of the four joints. This allows for the running of wires, plumbing, etc., if desired. If this is not wanted the plate may be uninterrupted.

Fig. 5 shows the plate 32 by itself.

Fig. 6 shows the application of the invention to the joining of two endwise abutted structural members 36. In place of the housing member 16 of Figs. 1 and 2 a similar member 38 is utilized. This member has a plane end wall 39 and two triangular side walls 40 and 41 attached thereto and extending in parallelism. The end wall 39 is formed with two struck out portions 42. The ends of the members 35 and 36 are formed with slots 37 which receive the loops or struck out portions 42.

There is also provided a plate 43 which fits within the members 35, 36. The plate is formed with slots 44 located so that they coincide with the slots 37 when the plate is received within the channel shaped structural members 35, 36. The loops 42 extend through the slots 44 also. The bladder 30, hinge 25 and pin 27 are assembled as before with the ends of the pin 27 extending through holes formed in the side walls 40, 41 of member 38 and the tabs of the hinge behind the loops 42.

Figure 7:
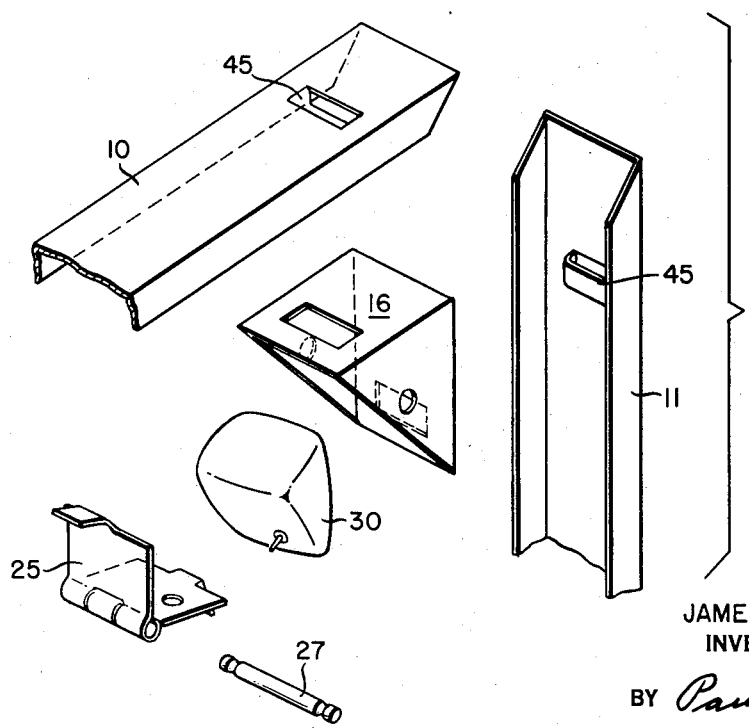

Fig. 7 illustrates a variation of the joint of Figs. 1, 2, and 3 in which the member 16 is placed within the angle formed by the ends of the members 10, 11. In this variation the loops or struck out portions are formed in the structural members rather than the member 16 and are shown at 45. The member 16 is provided with slots accommodating the loops. This joint will not be as strong as that of Figs. 1, 2 and 3.

The joint is shown in all forms as utilizing a bladder as the resilient member. While this construction is to be greatly preferred, other resilient members such as spring elements may be substituted therefor. These elements, however, lack several important advantages of the bladder. They do not possess the important advantage of being collapsable at will as does the bladder. Furthermore, they do not exert outward force against the elements of the joint uniformly in all directions as does the bladder.

It can be seen that the invention provides a means for rapidly joining into a rigid unit structural elements of conventional shapes. The components of the joint are few and are easily and simply made. The joint may be assembled and disassembled at will and used many times. The joint is not bulky and does not impair the normal functions of structures assembled by this means.

What is claimed is:

1. Means for joining the abutting ends of a pair of structural members extending in angular relationship, said means comprising a housing receiving and enclosing said ends, said housing being formed with surfaces conforming to and lying along said ends, a pair of loops attached to said housing, each of said loops extending through a hole formed in a respective one of said ends, a hinged element located between said ends and extending between said loops, a hinge pin joining the relatively movable parts of said hinged element and having its ends in lateral bearing contact with said housing, and a resilient member compressed between said hinged element and said ends and forcing a portion of said hinged element between each of said loops and the one of said ends through which it extends.

2. Means for joining the abutting ends of a pair of structural members extending in angular relationship as set forth in claim 1, said resilient member comprising a resilient bladder.

3. Means for joining the abutting ends of a pair of structural members, said means comprising a connecting member formed with surfaces conforming to and lying along said ends, a pair of side webs secured to said connecting member, said webs extending at right angles to said surfaces and in mutual parallelism, a hinged element spanning said ends, a hinge pin joining the relatively movable parts of said hinged element and having its ends in lateral bearing contact with said webs, means interconnecting each of said structural members with said connecting member, each of said interconnecting means comprising a loop connected to the one of said members farthest from said hinge pin and passing through an opening in the one of said members intermediate it and said hinge pin, said hinged element extending between said loops, and a resilient member compressed between said hinged element and said members and forcing a portion of said hinged element between each of said loops and the one of said members through which it extends.

4. Means for joining the abutting ends of a pair of structural members, as set forth in claim 3, said resilient member comprising a resilient bladder.

5. Means for joining a pair of structural members comprising a connecting member formed with surfaces conforming to and lying along the ends of said structural members which are to be joined, a loop secured to each of said ends and extending through a hole formed in said connecting member, a pair of side webs secured to said connecting member, said webs extending at right angles to said surfaces and in mutual parallelism, a hinged element spanning said ends and extending between said loops, a hinge pin joining the relatively movable parts of said hinged element and having its ends in lateral bearing contact with said webs, and a resilient member compressed between said hinged element and said connecting member, and forcing a portion of said hinged element between each of said loops and said connecting member.

6. Means for joining a pair of structural members as set forth in claim 5, said resilient member comprising a resilient bladder.

7. Means for connecting into a unitary structure a plurality of pairs of structural members, the members of each of said pairs extending in angular relationship, said means comprising, for each of said pairs, a housing receiving and enclosing the abutting ends thereof, said housing being formed with surfaces conforming to and lying along said ends, a pair of loops attached to said housing, each of said loops extending through a hole formed in a respective one of said ends, an element located between said ends and extending between said loops, and a resilient member compressed between said element and said ends and forcing a portion of said element between each of said loops and the one of said ends through which it extends whereby said pairs of members are arranged about an axis with one member of each of said pairs extending in adjacent parallel relation with said axis and the remaining member of each of said pairs extending radially from a common point on said axis, said connecting means comprising: a plate spanning the housings of the said joining means, a plurality of loops extending from said plate, said loops of said plurality of loops being so located and dimensioned that each lies in superimposed and adjacent relation to a respective one of the loops in said housings, whereby one of said portions of said element in each of said housings extends between said superimposed loops and the one of said ends through which said superimposed loops extend.

References Cited in the file of this patent

UNITED STATES PATENTS

| | | |
|---|---|---|
| 566,593 | Lynch | Aug. 25, 1896 |
| 583,375 | Hood | May 25, 1897 |
| 764,487 | Morrison | July 5, 1904 |
| 777,079 | Cottle | Dec. 13, 1904 |
| 898,751 | Krantz | Sept. 15, 1908 |
| 2,388,572 | Regenhardt | Nov. 6, 1945 |
| 2,444,286 | Dzurnak et al. | June 29, 1948 |